United States Patent
Uffner et al.

(10) Patent No.: US 7,350,789 B2
(45) Date of Patent: Apr. 1, 2008

(54) ROLLING CUBE CONTAINER WITH LID

(75) Inventors: Michael G. Uffner, Naperville, IL (US); Robert Kopp, Wheaton, IL (US)

(73) Assignee: Suncast Corporation, Batavia, IL (US)

( * ) Notice: Subject to any disclaimer, the term of this patent is extended or adjusted under 35 U.S.C. 154(b) by 302 days.

(21) Appl. No.: 11/076,675

(22) Filed: Mar. 9, 2005

(65) Prior Publication Data

US 2006/0201943 A1 Sep. 14, 2006

(51) Int. Cl.
*B62D 39/00* (2006.01)
*B65D 21/032* (2006.01)

(52) U.S. Cl. .................... 280/33.998; 206/503

(58) Field of Classification Search ........... 280/33.991, 280/33.998, 79.5; 206/303, 304, 304.1, 508, 206/513, 515; 220/23.83, 788, 324, 508, 220/608, 609
See application file for complete search history.

(56) References Cited

U.S. PATENT DOCUMENTS

| | | | |
|---|---|---|---|
| 588,721 A * | 8/1897 | Thomas | 190/3 |
| 3,376,046 A | 4/1968 | Kivett et al. | |
| 3,419,184 A * | 12/1968 | Asenbauer | 206/508 |
| 3,878,939 A * | 4/1975 | Wilcox | 206/373 |
| 4,523,692 A * | 6/1985 | Lemkin | 220/788 |
| 5,042,674 A * | 8/1991 | Ramsay et al. | 220/4.24 |
| 5,186,330 A | 2/1993 | McClure | |
| 5,445,396 A | 8/1995 | Sebor | |
| 5,564,805 A * | 10/1996 | Dickinson | 312/249.8 |
| 5,709,008 A * | 1/1998 | Dickinson | 16/45 |
| 5,785,328 A | 7/1998 | Eckloff | |
| 6,128,853 A * | 10/2000 | Klonel et al. | 47/39 |
| 6,257,152 B1 | 7/2001 | Liu | |
| 6,585,090 B2 * | 7/2003 | Harvey | 190/108 |
| 6,708,824 B2 | 3/2004 | Sahm, III | |
| 2004/0108666 A1 | 6/2004 | Lauer | |

* cited by examiner

*Primary Examiner*—Christopher P. Ellis
*Assistant Examiner*—Bridget Avery
(74) *Attorney, Agent, or Firm*—McHale & Slavin, P.A.

(57) ABSTRACT

The present invention provides an assembly, or kit, of injection molded components having integrated connectors which combine to form a storage container having a plurality of snap-in spherical roller assemblies and a cooperating lid member. The storage container components are formed of injection molded plastic and include integrally formed connectors to interlock with one another without the need for separate fasteners. The integrated assembly of the bottom storage container panel and the spherical roller assemblies simplifies storage container construction and minimizes the number of components required to complete the assembly.

17 Claims, 11 Drawing Sheets

ROLLING CUBE CONTAINER WITH LID

FIELD OF THE INVENTION

This invention relates generally to storage containers. More specifically, the present invention relates to a storage container which includes a plurality of spherical roller assemblies integrated within a bottom surface of the container. The container includes a cooperating lid and latch assemblies for enclosing contents within the storage container. A plurality of the containers and cooperating lids are both nestable and stackable for shipment and storage.

BACKGROUND INFORMATION

Throughout the home, a need exists to store a large variety of different items. This is particularly true of garage and utility areas where a vast array of products have been developed to increase the comfort level of living. The accumulation of these various objects and products gives rise to a need for adequate storage of those items when not in use.

Industry and business are other areas where a need exists to store a large variety of items. Numerous types of businesses and warehouses utilize and/or manufacture products which require storage. These products are often placed in bins or containers of various types and stacked on pallets or within larger containers for movement or shipment. The containers are often nestable when empty for a compact storage configuration, and stackable when filled via some type of covering for the top portion of the container.

For example, in the past it is known to nest empty containers by shaping them so that some portion of the bottom of one container is captured by the top of another identical container, or visa versa. One common form is where the containers are tapered so that the Lower portion of the container is smaller than the upper portion. This configuration allows the bottom portion of one container to be captured by the top of another identical container. This construction works well for forming stacks of empty containers. U.S. Pat. No. 6,708,824 discloses a vertically nestable tub-like container which utilizes this type of construction.

While this construction minimizes the space required to store empty containers, without any type of covering for the top of the container or wheeled dolly, the containers are often difficult to stack and/or move once filled.

Alternatively containers filled or unfilled, may be stacked on wheeled pallets or dollies for easier transport. The pallets or dollies are often constructed to be nested or stacked when empty to reduce storage space requirements. For example, U.S. Pat. No. 6,257,152 discloses a stackable pallet structure with wheels. Each pallet has a stop barrier on three sides, the remaining one side has a beveled surface tilting downward. Two longitudinal grooves are provided on the two mutual opposite longitudinal sides of the pallet. A plurality of insertion holes are provided between the grooves. The pallet includes a fixed wheel set and a movable wheel set, and has on the bottom thereof a plurality of engaging portions and engaging strips. When the pallets are stacked in a mutual orthogonal state, the engaging strips and engaging portions on the bottom of the upper pallet are respectively engaged in the insertion holes and longitudinal grooves on the lower pallet, so that the pallet structure has the function of direction correcting for positioning when in stacking of the pallets.

U.S. Pat. No. 5,445,396 discloses a nestable dolly construction particularly suited for plant containers. The dollies include a platform having opposing upper and lower surfaces. The lower surface includes a plurality of castor wheel assemblies secured thereto and the upper surface includes a plurality of wheel wells for receiving a castor assembly of another nested dolly.

U.S. Pat. No. 3,376,046 discloses containers which include tapered side and end walls so they are nestable within each other for storage. Lids for the containers have depressed top portions forming pockets for receiving the bottom of a stacked container. The lids include wheels secured to their bottom surface, whereby the lid may be used on the bottom of a stack as a dolly. Alternatively, the lid may be used to cover the top of the container wherein the wheels are hidden within the container.

U.S. Pat. No. 5,785,328 discloses a stacking member for stacking one hamper cart on another hamper cart. The device is generally a lid which fits over the top of the cart. The lower surface of the plate includes depending perimeter walls for alignment with the top of the cart. The upper surface of the plate includes a pair of parallel rectangular members for chocking the wheels of a stacked cart to prevent movement thereof.

In general, the dolly constructions are cumbersome to use, requiring the container to be aligned with the dolly prior to filling, or the filled container must be lifted and fit into the dolly. Stacking of the dollies is also cumbersome often requiring precise alignment that may include alignment of the castors.

It is also known in the prior art to construct stackable containers which include wheels for moving the filled containers. For example, U.S. Pat. No. 5,186,330 discloses an infectious waste container. The device includes a container having a plurality of castors mounted its bottom surface and a lid which is sealable to the container body. The container includes a target region projecting inwardly from the container floor and an alignment region extending outwardly from the container's lid. Upon vertically adjacent positioning of a similar container, the alignment region and target regions cooperatively inter-fit.

U.S. Patent Publication No. 2004/0108666 discloses a wheeled refuse container having an axle and a pair of wheels connected to the axle. A slot is disposed along each side of the bottom portion of the wheeled container for receiving the axle. The slot has an inboard end in which the wheels are positioned for nesting of the wheeled container in another container and an outboard end in which the wheels are positioned for use.

One of the problems associated with such systems is the wheel or caster assemblies tend to be rather large and bulky which limits container nesting depth. Further, such systems are relatively complicated and difficult to fabricate, resulting in high costs to consumers.

Such prior art systems have not met all of the needs of manufacturers to provide a product that can be easily manufactured, packaged and shipped, or the needs of consumers requiring economical and versatile storage containers.

Paramount among such needs is a container which includes integrally incorporated rollers to permit transport of filled containers by an average homeowner without tipping or separation from a dolly. Structure is a further consideration, the container and its cooperating lid and roller assemblies must resist separation, buckling and racking in such a way as to unify the entire container.

Also, from a versatility standpoint, a cooperating lid should be present which permits secure stacking of containers, and which provides security and dependable access to the contents of the containers without the complex and difficult to assemble devices associated with the prior art.

There are also commercial considerations that must be satisfied by any viable container system; considerations which are not entirely satisfied by state of the art products. The container must be formed of relatively few component parts that are inexpensive to manufacture by conventional techniques. A plurality of the containers and/or lids should also be capable of being packaged and shipped in a nested state.

In addition, the container system must assemble together in such a way so as not to detract from the internal storage volume of the resulting container or otherwise negatively affect the utility of the container.

BRIEF DESCRIPTION OF THE INVENTION

The present invention provides an assembly, or kit, of injection molded components having integrated connectors which combine to form a storage container having a plurality of snap-in spherical roller assemblies and a cooperating lid member. The storage container components are formed of injection molded plastic and include integrally formed connectors to interlock with one another without the need for separate fasteners. The integrated assembly of the bottom storage container panel and the spherical roller assemblies simplifies storage container construction and minimizes the number of components required to complete the assembly. Injection molding allows the components to be formed with integral connectors, ribs and gussets for increased rigidity. When supplied as a kit, assembly of the storage container requires minimal hardware and a minimum number of hand tools. The container includes a base panel and a plurality of integrally formed upstanding side panels. The base panel is constructed with integrally formed sockets which are each constructed and arranged to accept a spherical roller. Externally formed rings on the sockets interlock with retainer rings to maintain positioning of the spherical rollers within their respective sockets. The engagement between the retaining rings and the sockets serve to rigidly connect the components together, preventing separation under loads to provide a structurally sound rolling storage container with a pleasing aesthetic appearance. Internal surfaces of the sockets include integrally formed support bearings for the spherical rollers which lower friction and reduce dirt buildup on the external surface of the roller.

The upper portion of the container includes integrally molded handrails extending around the perimeter of the upstanding side panels. The handrails include a plurality of integrally formed handholds for improved gripping and/or lifting of filled or unfilled containers. Each handrail is constructed to accept at least one snap-in lid latch member which cooperates with a lid member.

The snap-in latch members and roller assemblies minimize complexity of completing assembly of the storage container while increasing versatility by allowing the consumer to customize the assembly for specific needs. The snap-in construction of the latch members and roller assemblies eliminate the need for skilled tradesmen to line-up and mount complicated hardware on or within the container. In this manner the consumer can select a plurality of containers having various capacities, snap in the roller assemblies, and thereafter snap in the latch members to complete the assembly. This construction allows the containers to be easily assembled, opened and closed while also permitting the container to be rolled across generally flat surfaces without tipping.

The lid members are pre-constructed of polymeric material including a flange which extends around the perimeter of the lid. The flange includes a downwardly facing channel constructed and arranged to cooperate with the container handrail in an overlapping fashion. The latches align with recesses integrally formed into the lid member to increase the structural integrity of the container as well as prevent stored items within the container from spilling out. The upper surface of each lid member is adapted to cooperate with an axial aligned vertically stacked storage container to prevent the upper container from rolling, sliding or tipping.

In operation, the storage containers may be stored in an axially aligned nested arrangement without the cooperating lids or in a stacked arrangement with the cooperating lids in place. A plurality of the lids may be stored in a nested axial aligned relationship for shipment or storage. A stack of containers and a stack of inverted cooperating lids may also be stacked in an axial aligned relationship for an even more compact arrangement.

Accordingly, it is an objective of the present invention to provide a polymeric rolling storage container assembly having a plurality of integrated spherical roller assemblies.

It is a further objective of the present invention to provide a rolling storage container which includes a bottom surface having at least a portion of a roller assembly integrally formed therein.

Yet a further objective of the present invention is to provide a rolling storage container in which at least a portion of the roller assembly snaps into engagement with the bottom surface of the container.

Still yet a further objective of the present invention is to provide a rolling storage container having integrated spherical roller assemblies which allows a plurality of storage containers to be stored or shipped in a nested and/or stacked arrangement.

Another objective of the present invention is to provide a rolling storage container assembly constructed from components having integrated connectors which accommodate injection molding plastic formation of the components for increased structural integrity and a compact configuration.

Yet another objective of the present invention is to provide a rolling storage container kit in which the container, lid, and spherical roller assemblies may be interlocked without the need for separate fasteners.

Still yet another objective of the present invention is to provide a kit for a rolling storage container that is capable of being packaged and shipped in a disassembled state and constructed at a desired site without the need for additional tools.

Other objectives and advantages of the present invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENTS

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated.

Figure 1:
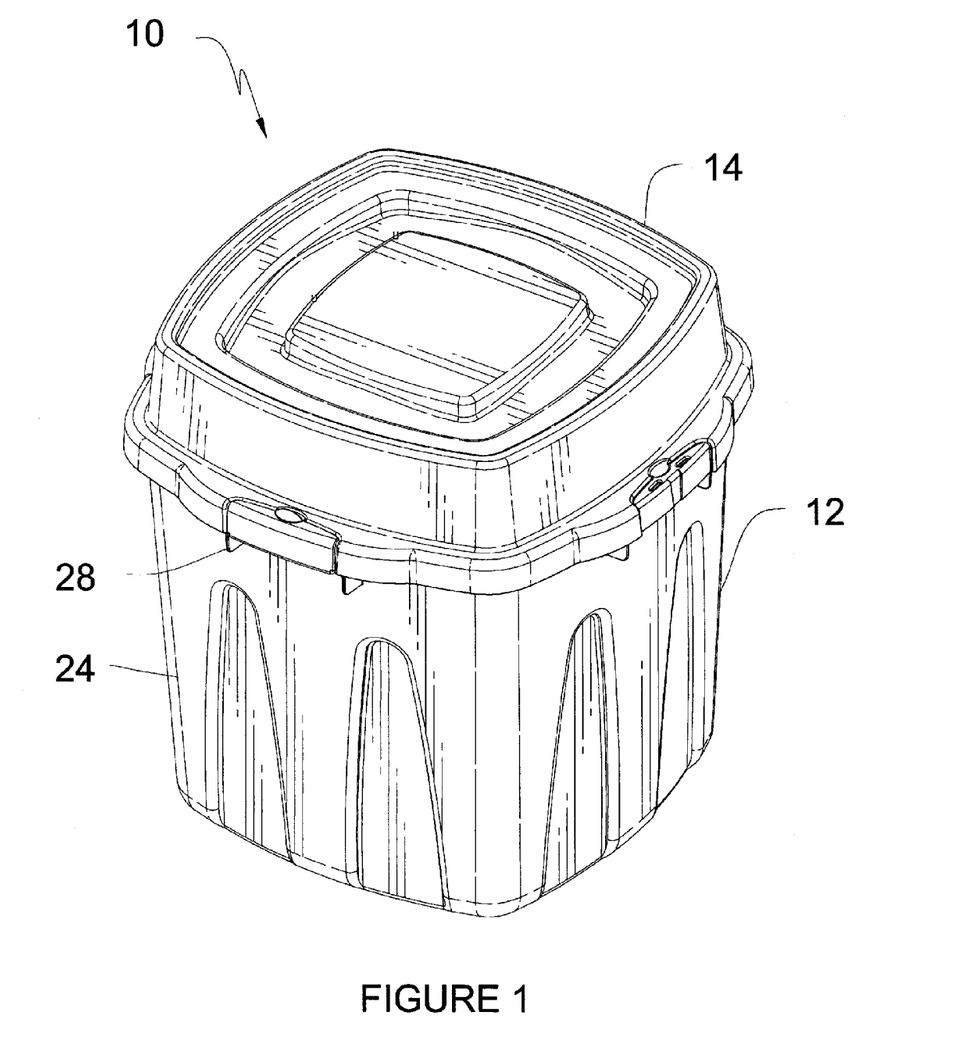
FIG. 1 is a top perspective view of the instant invention.
Figure 2:
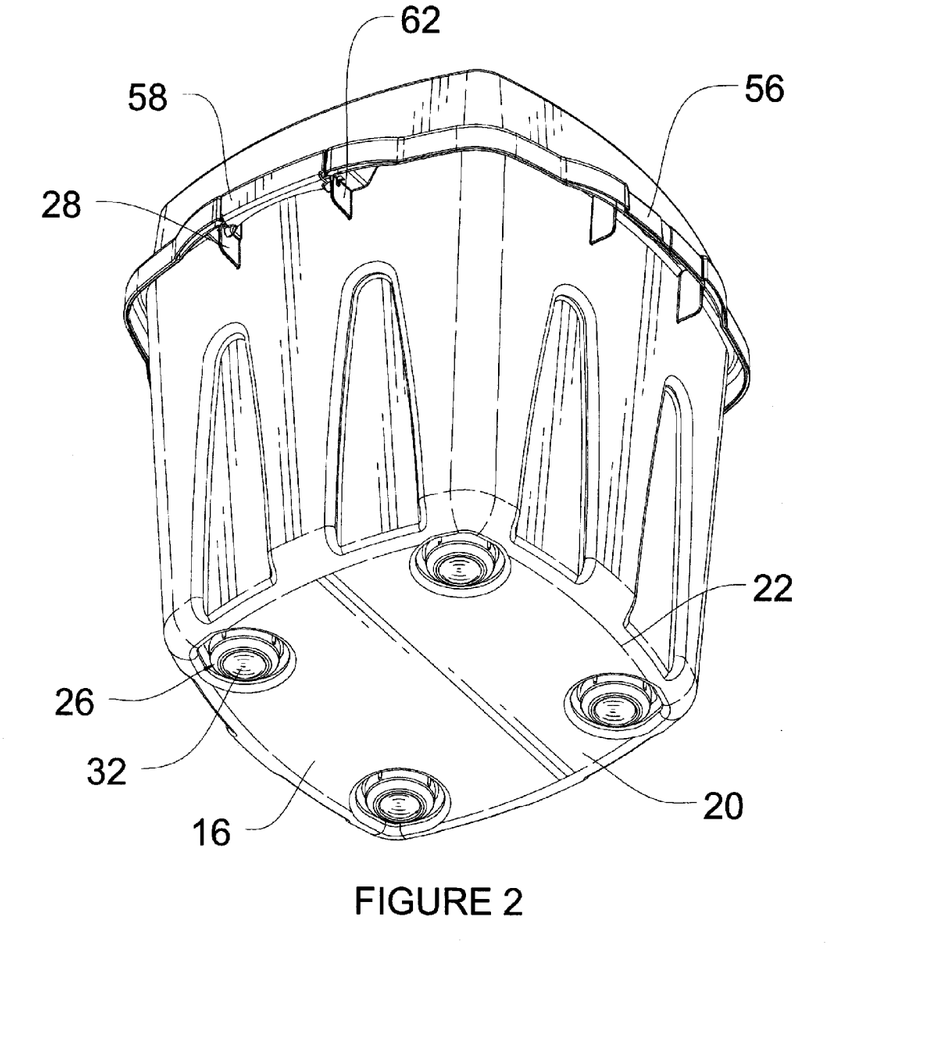
FIG. 2 is a bottom perspective view of the instant invention.
Figure 3:
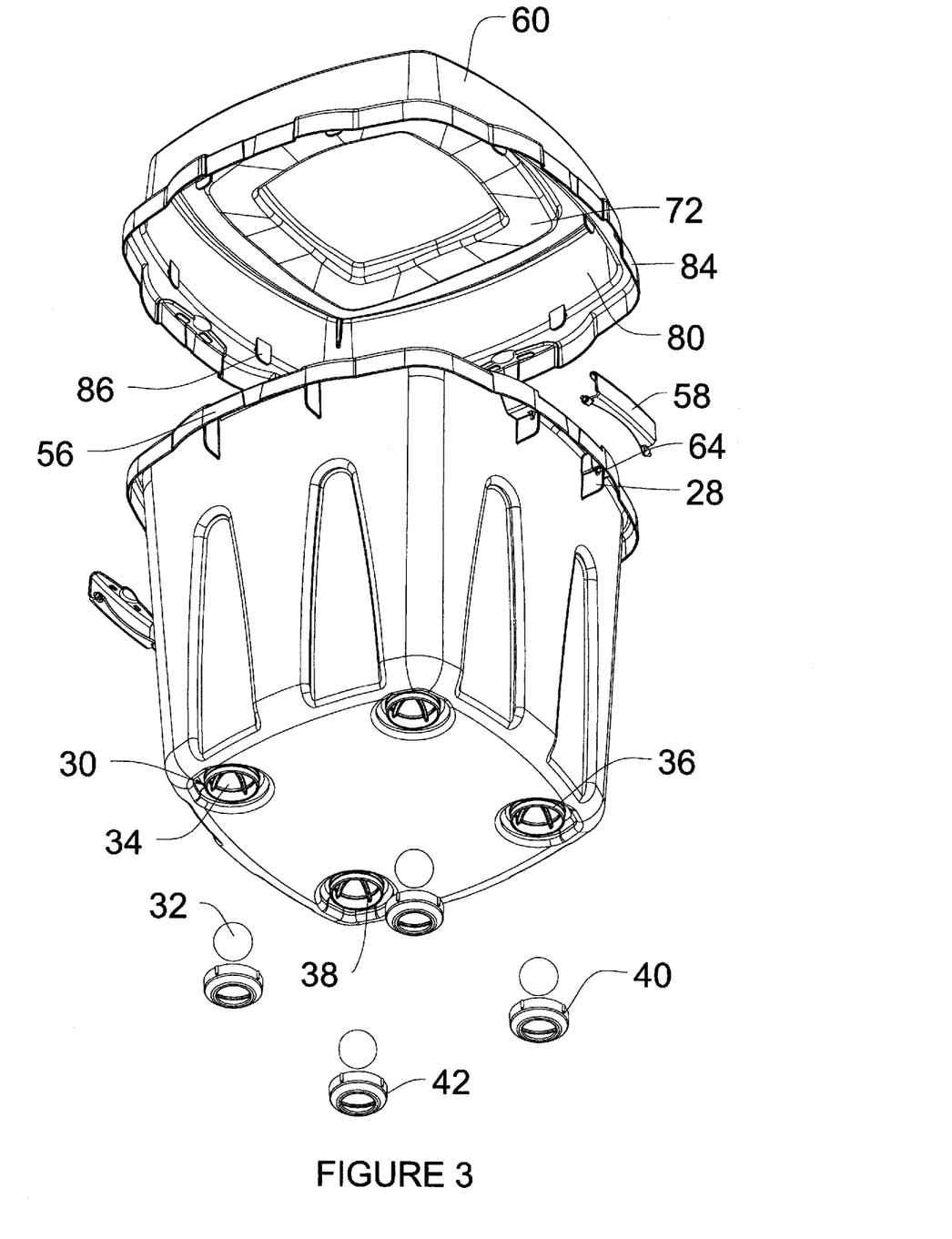
FIG. 3 is a bottom perspective exploded view of the instant invention.
Figure 4:
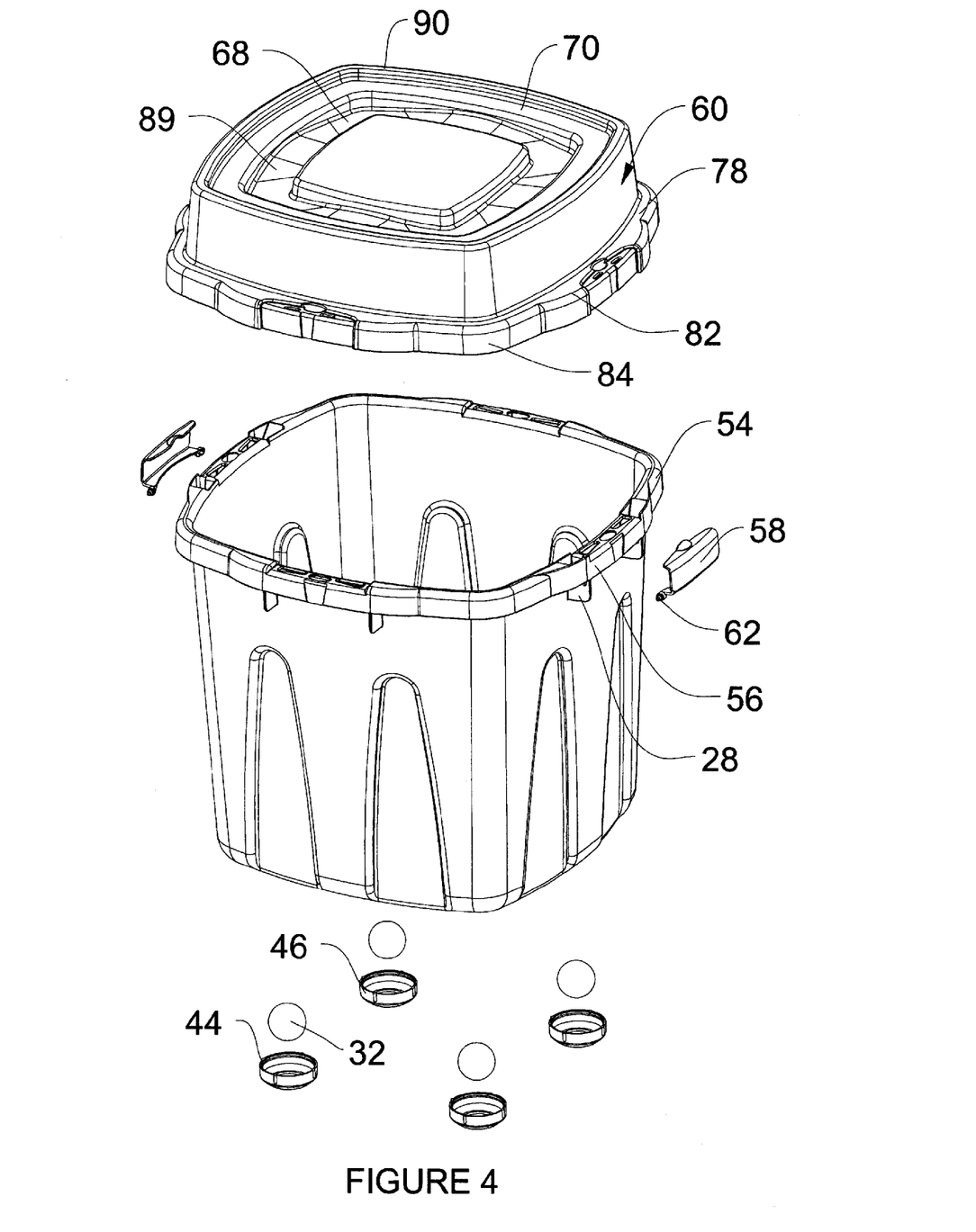
FIG. 4 is a top perspective exploded view of the instant invention.
Figure 5:
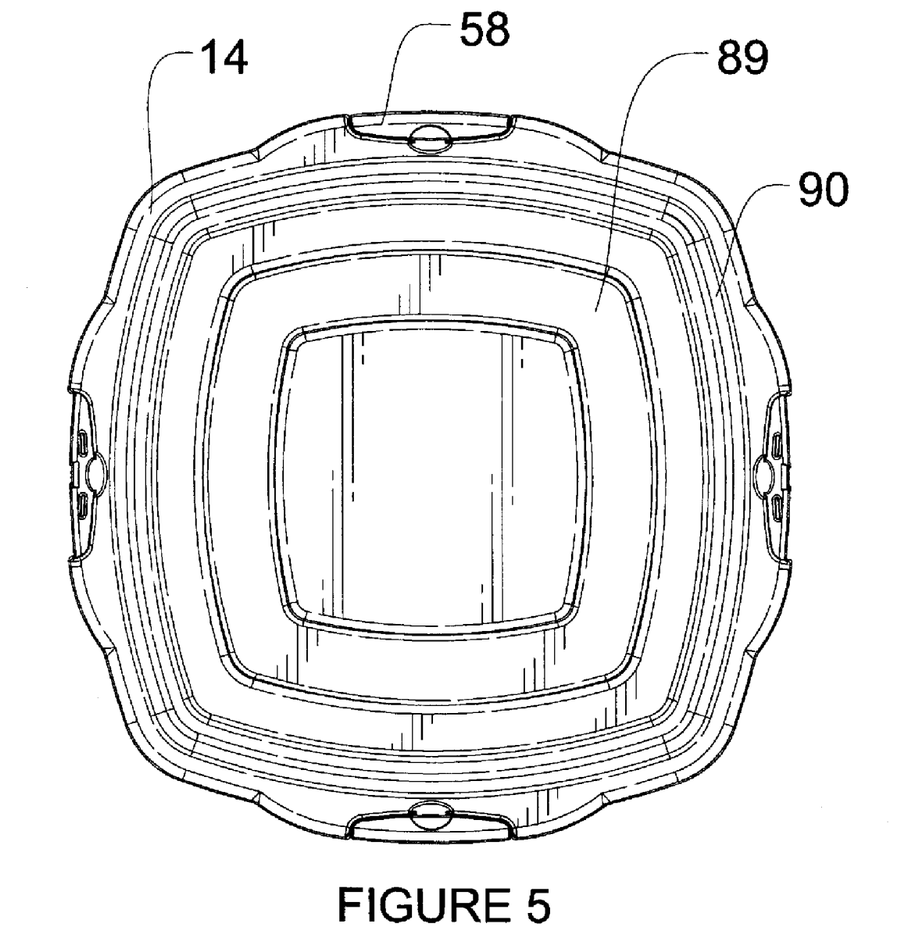
FIG. 5 is a top view of the instant invention.
Figure 6:
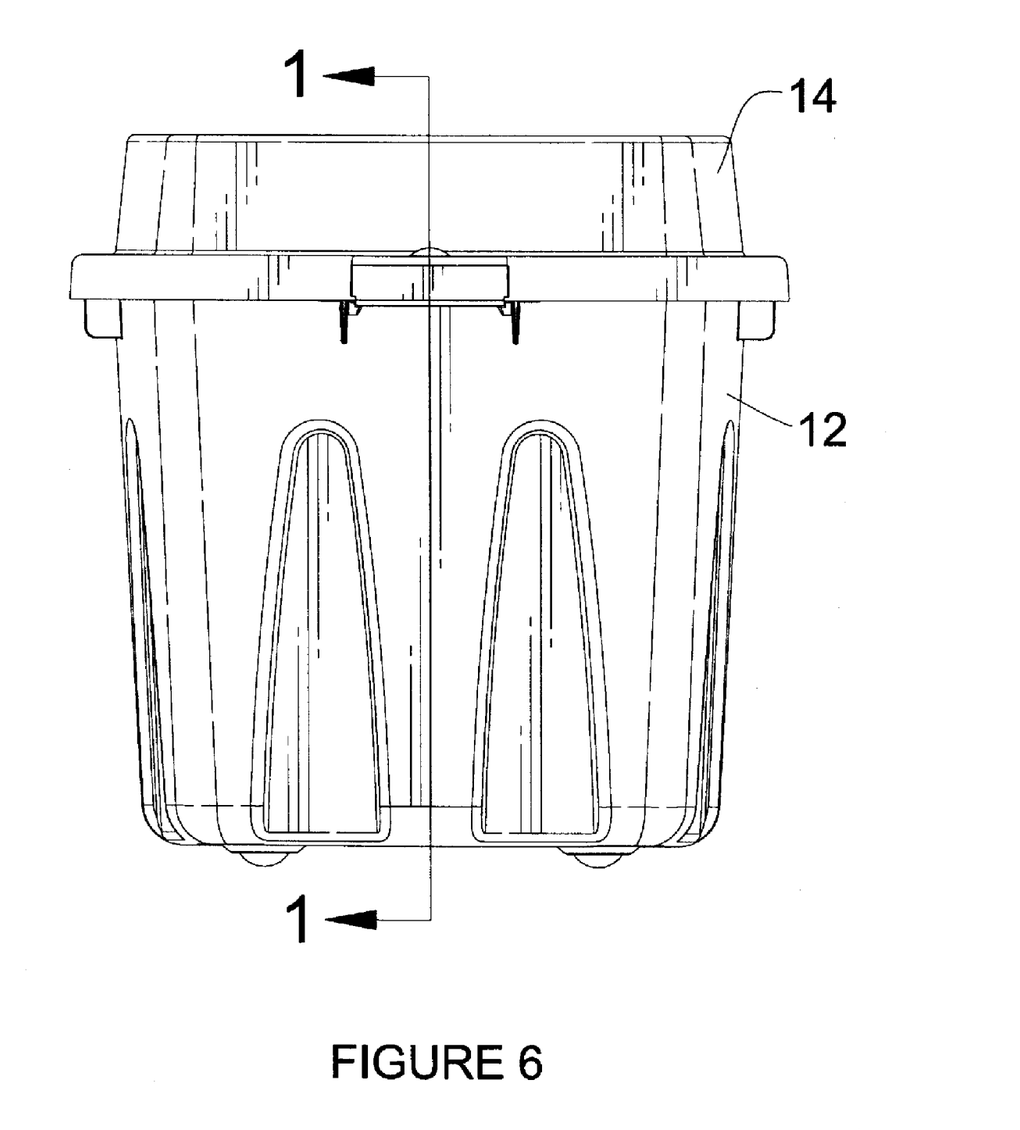
FIG. 6 is an end view of the instant invention.
Figure 7:
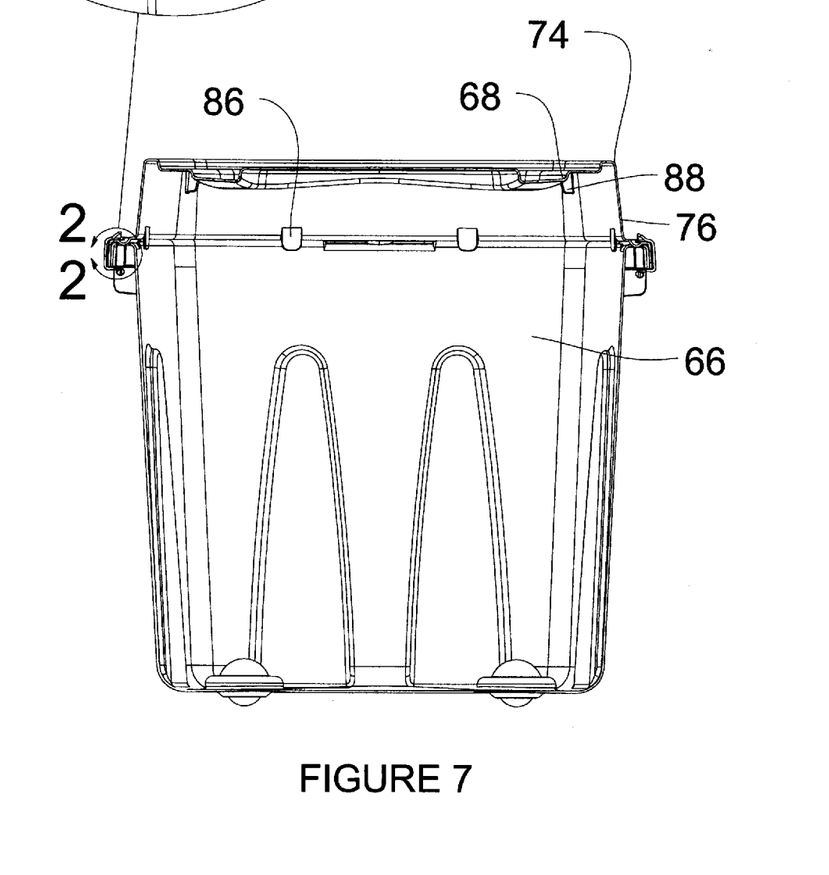
FIG. 7 is a section view taken along line 1-1 of FIG. 6.
Figure 8:
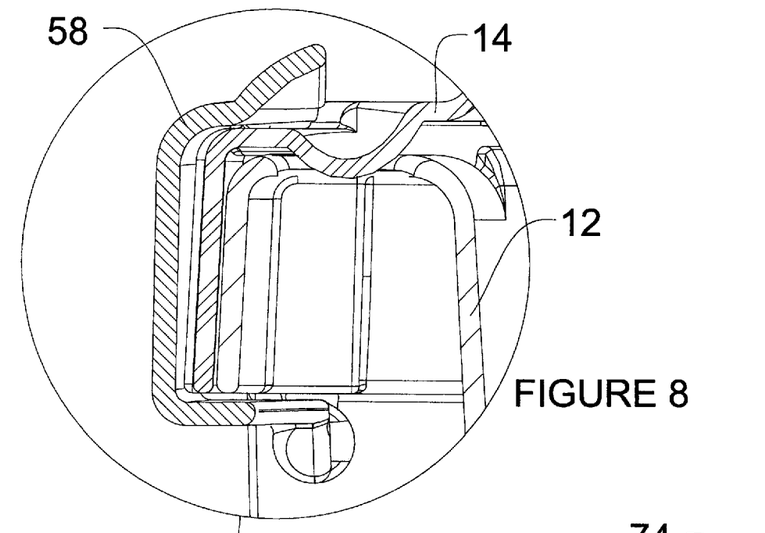
FIG. 8 is a section view taken along line 2-2 of FIG. 7.
Figure 9:
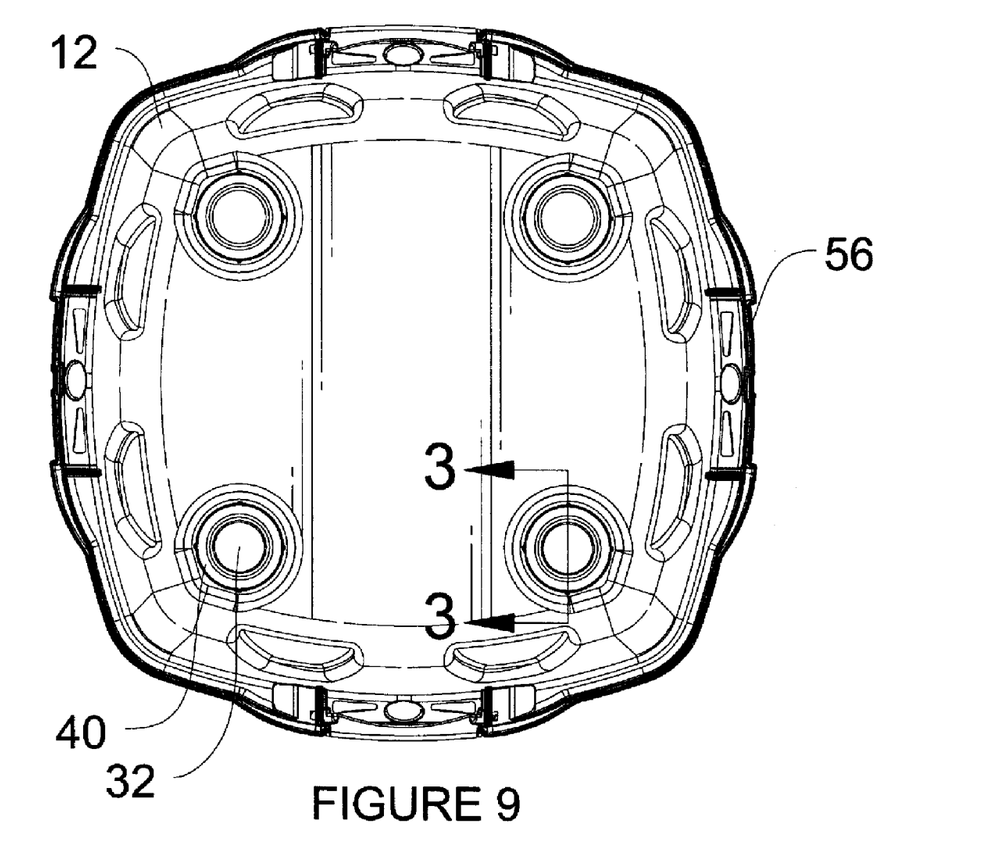
FIG. 9 is a bottom view of the instant invention.
Figures 10, 12:
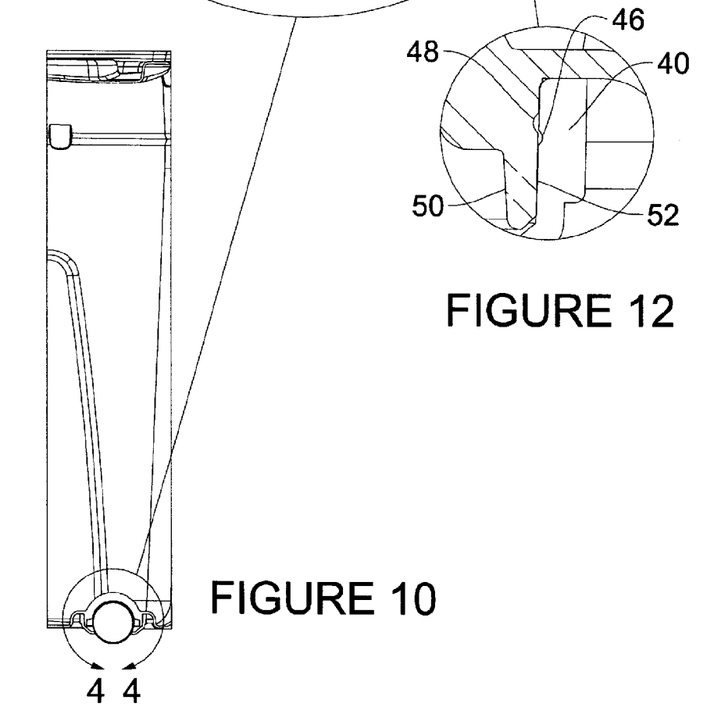
FIG. 10 is a section view taken along line 3-3 of FIG. 9.
FIG. 12 is a section view taken along line 5-5 of FIG. 11.
Figure 11:
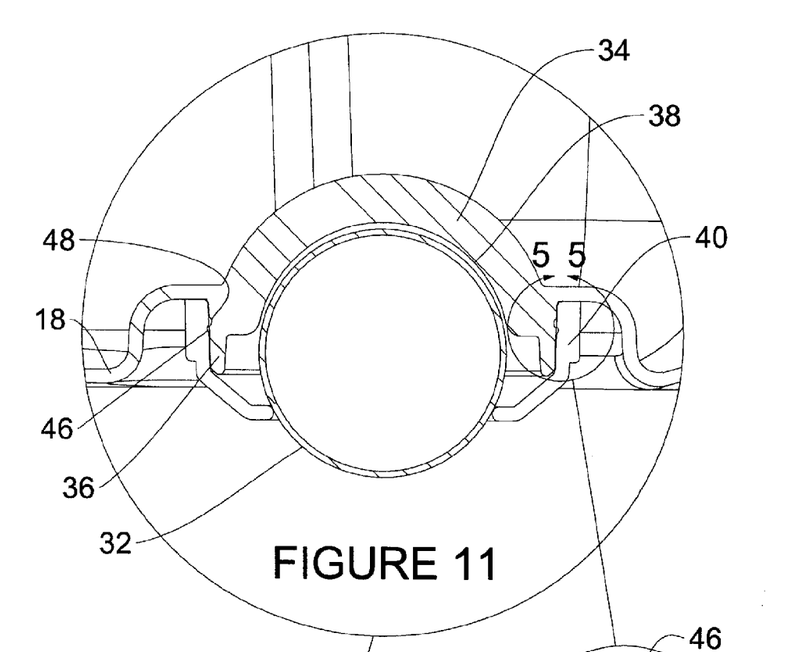
FIG. 11 is a section view taken along line 4-4 of FIG. 10.

Referring to FIGS. 1-14, one embodiment of the rolling storage container 10 is illustrated. The rolling storage container generally includes a container portion 12 and a lid 14. In the preferred embodiment, the components comprising the rolling storage container are formed of, but not limited to, a suitable polymeric material through the process of injection molding. The result is that the components comprising the storage container 10 are formed as unitary panels with integral connectors. Strengthening ribs 28 are integrally formed within the container portion 12 and lid 14 in order to enhance rigidity of the components while leaving the external surface in a generally smooth condition for aesthetic purposes, as shown in FIG. 1. Injection molding offers significant weight, strength and stability advantages over wood or metal construction as utilized in the prior art. The container portion 12 includes a base panel 16 for enclosing the bottom portion of the container. The base panel includes an upper surface 18 (FIG. 11), a lower surface 20 and a perimeter 22. A plurality of integrally formed side walls 24 extend upwardly from the base panel perimeter defining the container portion 12. A plurality of spherical roller assemblies 26 are integrated into the lower surface of the base panel so that they protrude slightly below the lower surface. The rollers support the storage container as feet when the container is stationary, and allow the container to be easily rolled in any direction across a generally smooth surface. Integrating the spherical rollers into the base panel offers numerous advantages over the bolt-on caster and wheel assemblies of the prior art. For example, the number of components required to complete the assembly is significantly reduced. In addition, assembly time and complexity of the assembly are also reduced. The components are manufactured to include integral connectors, permitting a snap-together assembly, thereby eliminating the need for additional tools or fasteners. In this manner the storage container may be purchased as a kit and assembled by the consumer at any desired site.

For integrating the spherical rollers into the base panel, the base panel includes a plurality of integrally formed sockets 30, each constructed and arranged to accept and retain a spherical roller 32 so that the spherical roller is free to rotate and extends below the bottom surface of the base panel. Each of the sockets include a cup portion 34 and a flange portion 36. The cup portion is generally conjugately shaped with respect to the spherical roller and the flange extends around the perimeter of the spherical roller. The flange includes an inner and an outer surface; the inner surface 50 acts as thrust bearing to inhibit lateral forces of the spherical rollers and the outer surface 52 includes at least one integrally formed flange holding groove 48. The flange holding groove is constructed and arranged to cooperate with a retaining ring 40 to retain the spherical roller within the socket whenever the rollers lose contact with a surface. Integrally formed within the socket is a plurality of support bearings 38 which reduce friction between the spherical roller 32 and the cup portion of the socket. In addition, the support bearings act as scrapers to remove debris from the outer surface of the spherical rollers as they rotate.

Still referring to FIGS. 1-14, the retaining ring 40 is generally annular in shape having an outer surface 42 and an inner surface 44. The inner surface includes a retaining ring holding groove 46 positioned to cooperate with the flange holding groove 48 to retain the spherical roller 32. The retaining ring holding grooves are constructed and arranged to mateably engage with the flange holding grooves in an inter-fitting axial aligned engagement. The coupling engagement between the sockets and retaining rings as described above provides a secure connection and offers several advantages. First, the design allows the components to be connected without the need for separate fasteners. Second, the design creates a positive lock that prevents separation of the components. Third, the design maintains alignment of the components and maintains alignment of the spherical rollers. The resultant spherical roller assembly created by the combination of the interlocking components benefits from high structural integrity and reliable operation.

Still referring to FIGS. 1-14, the upper portion of the container 12 includes an integrally molded handrail 54 extending around the perimeter of the upstanding side panels. The handrail includes a plurality of integrally formed handholds 56 for improved gripping and/or lifting of filled or unfilled containers. Each handrail is constructed to accept at least one snap-in latch member 58 which cooperates with a lid member 60. The latch member includes a pair of outwardly extending hinge pins 62 which are constructed and arranged to snap into engagement with a pair of strengthening rib apertures 64. Once snapped into place the latch member is free to rotate about the hinge pins between latched and unlatched positions. In the latched position the latch member is rotated into a coupling engagement with the lid, resulting in a mechanically secure connection therebetween. In the unlatched position the latch member is rotated downward wherein the lid is freely removable. In this manner the snap-in lid latch member mechanically and releasably secures the lid member to the storage container.

It should be noted that the hinges and latches as described could be replaced with other hinge and/or latch devices well known in the art, without departing from the scope of the invention.

Still referring to FIGS. 1-14, the lid 14 is generally constructed and arranged to cooperate with the storage container to enclose the internal cavity 66 within the container. The lid includes a cover panel 68 for enclosing the top portion of the lid. The cover panel includes an upper surface 70, a lower surface 72 and a perimeter 74, wherein a plurality of integrally formed side walls 76 extend downwardly from the cover panel perimeter terminating in an outwardly extending flange 78. The flange includes an inner perimeter 80 and an outer perimeter 82. An integrally formed depending wall 84 extends downwardly from the outer perimeter of the flange to cooperate with the handrail 54 in an overlapping fashion. Gussets 88 are integrally formed between the cover panel lower surface 70 and the side walls 76 to increase the strength and rigidity of the assembly. The cover panel upper surface 70 includes a generally rectangular channel 89 and a lip 90. The channel is constructed and arranged to cooperate with the base panel and provide clearance for a plurality of roller assemblies of a second stacked container to allow an axial aligned stacked arrangement of storage containers as shown in FIG. 14. The lip cooperates with the container side walls to prevent lateral movement of stacked containers.

In one embodiment a plurality of tabs 86 extend downwardly from the inner flange perimeter 80. The tabs cooperate with the container side walls 24 to prevent inward bowing or flexing thereof.

Figure 13:
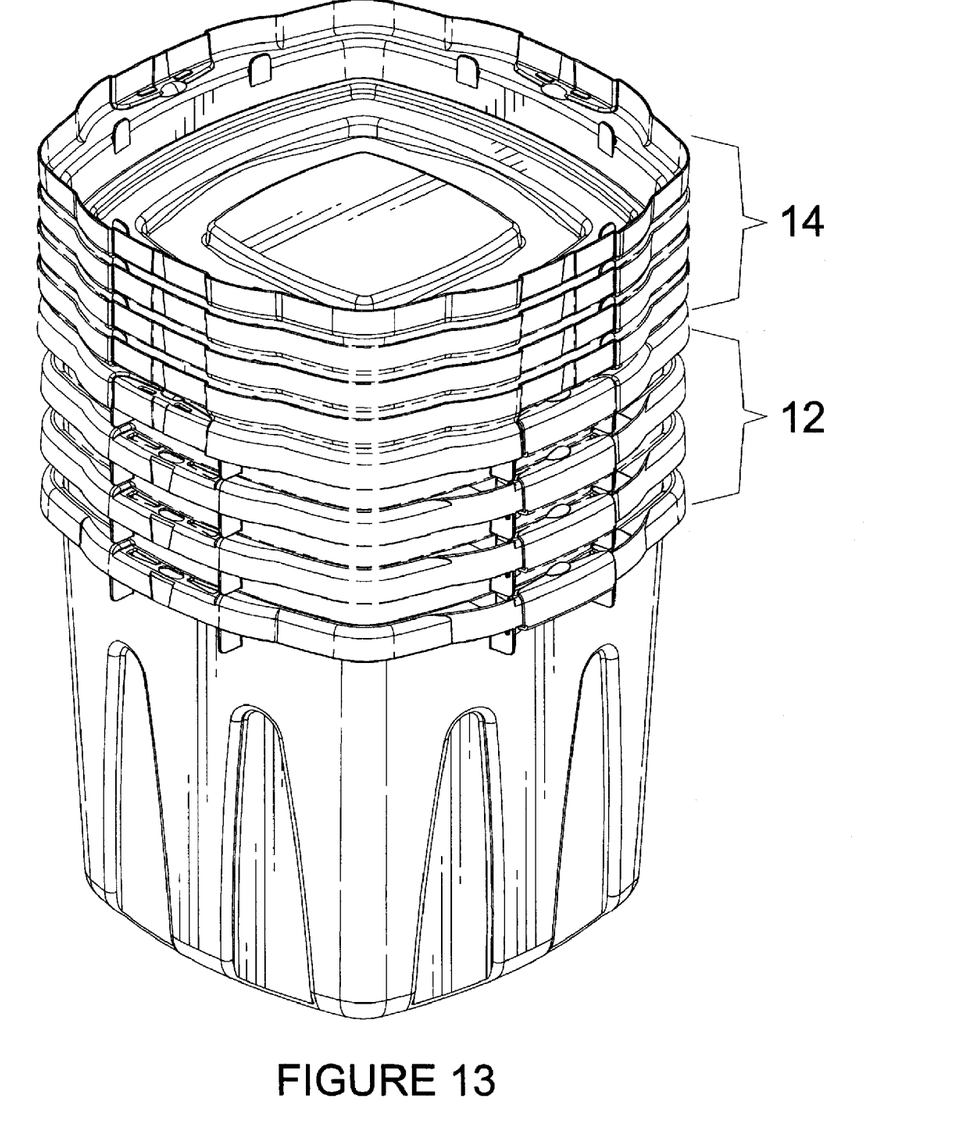
FIG. 13 is a front perspective view illustrating a plurality of lids and storage containers in a nested arrangement.
Figure 14:
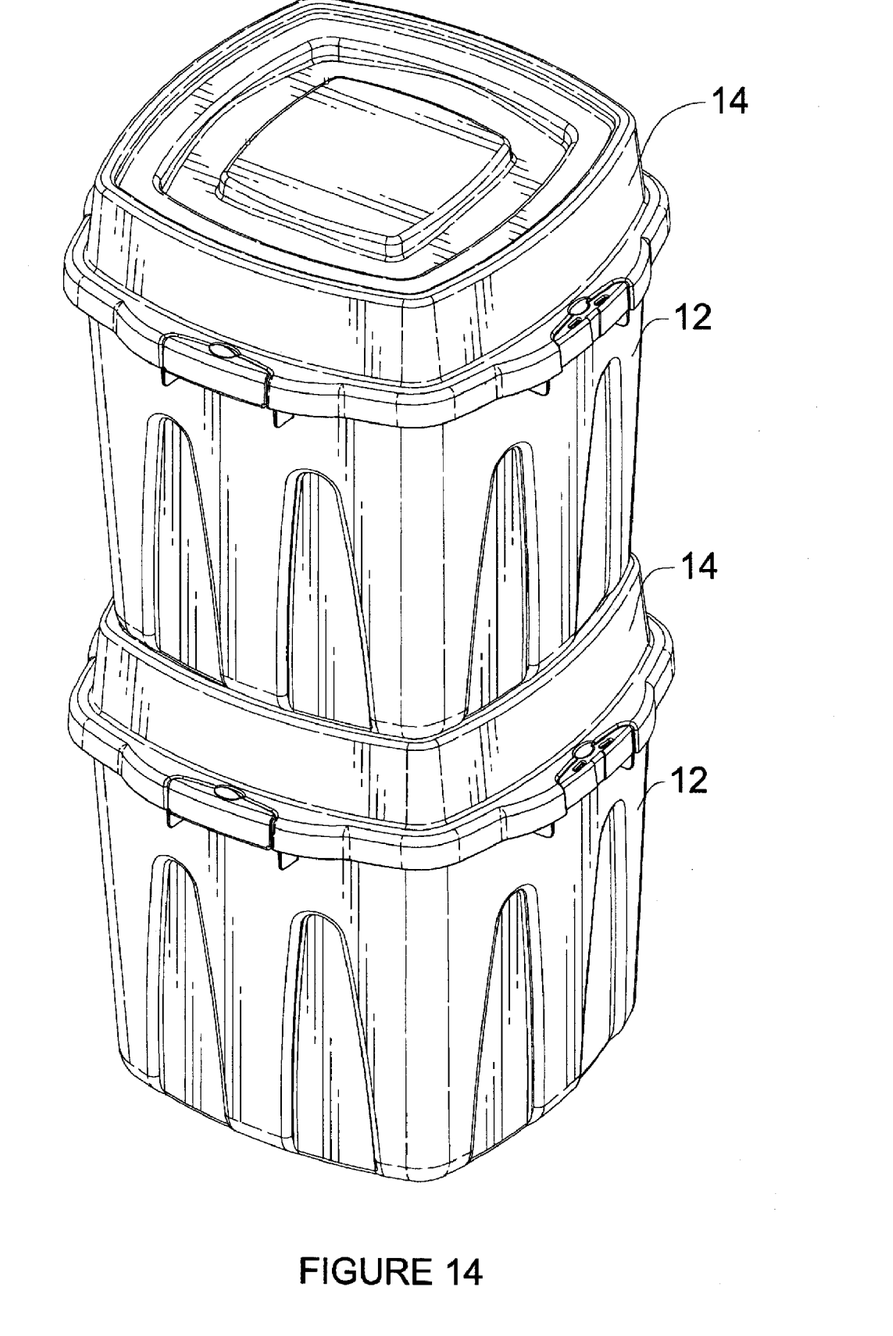
FIG. 14 is a top perspective view illustrating a plurality of storage containers with cooperating lids in a stacked arrangement.

Referring to FIG. 13, a plurality of containers 12 and lids 14 are illustrated in an axially aligned nested relationship. Both the containers 12 and lids 14 include tapered side walls 24, 76. In a most preferred embodiment, the side walls are sized so that the lids may be inverted and stacked in a nested relationship with the containers for compact shipment and storage.

Thus, a container with a plurality of integrated roller assemblies and a cooperating lid member has been shown and described. The rolling container may be supplied as a kit comprised of injection molded components having integrated connectors which may be assembled on a desired site without requiring separate fasteners or tools.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. In a plastic storage container including a base panel for enclosing the bottom portion of said container, said base panel including an upper surface, a lower surface and a perimeter, an integrally formed side wall extending upwardly from said upper surface of said base panel perimeter defining said container, the improvement comprising:

said side wall tapering outwardly as it extends upwardly and sized to fit within another like constructed container in a nested arrangement, said lower surface of said base panel including a plurality of integrally formed sockets each constructed and arranged to accept and retain a spherical roller so that said spherical roller is free to rotate and protrudes below said bottom surface of said base panel, each said socket including a cup portion and a flange portion, wherein said flange portion extends around the perimeter of said spherical roller, said flange including an inner surface and an outer surface;

whereby a plurality of like constructed containers may be stored or shipped in a nested arrangement with said spherical rollers assembled to said containers and whereby said storage container may be rolled in any direction along a substantially smooth surface on said plurality of spherical roller assemblies.

2. The plastic storage container as described in claim 1 wherein said cup portion is conjugately shaped with respect to said spherical roller.

3. The plastic storage container as described in claim 1 wherein said cup portion includes at least one support bearing for reducing friction between said spherical roller and said cup portion.

4. The plastic storage container as described in claim 1 wherein said outer flange surface includes a holding groove extending therearound, wherein said holding groove is constructed and arranged to cooperate with a retaining ring to retain said spherical roller within said socket.

5. The plastic storage container as described in claim 1 wherein said side walls include an upper portion, wherein said upper portion includes an integrally formed handrail, wherein said handrail forms an inverted U-shaped channel extending around the perimeter of said storage container.

6. The plastic storage container as described in claim 1 including a lid, wherein said lid is constructed and arranged to cooperate with said storage container to enclose an internal cavity within said container.

7. The plastic storage container as described in claim 3 wherein each said cup portion includes a plurality of said support bearings, wherein said plurality of support bearings are constructed and arranged to scrape debris from said spherical roller.

8. The plastic storage container as described in claim 4 wherein said retaining ring is constructed and arranged for coupling engagement with said socket flange to retain said spherical bearing within said socket.

9. The plastic storage container as described in claim 8 wherein said retaining ring includes an outer surface and an inner surface, wherein said inner surface includes a holding groove, wherein said retaining ring holding groove is positioned to cooperate with said flange holding groove to retain said spherical roller;

whereby said retaining ring may be assembled to said socket without additional fasteners or tools.

10. The plastic storage container as described in claim 5 wherein said handrail includes a plurality of integrally formed strengthening ribs for adding strength and rigidity to said storage container.

11. The plastic storage container as described in claim 5 wherein said handrail includes a at least two integrally formed handholds for improved gripping and lifting of said storage containers.

12. The plastic storage container as described in claim 5 wherein said handrail is constructed and arranged to cooperate with at least one snap-in lid latch member for mechanically and releasably securing a lid to said storage container.

13. The plastic storage container as described in claim 12 wherein said latch member is pivotally mounted to move between a latched position wherein said latch member is brought into a coupling engagement with said lid resulting in a mechanically secure connection between said storage container and said lid and an unlatched position wherein said lid is freely removable.

14. The plastic storage container as described in claim 6 wherein said lid includes a cover panel for enclosing the top portion of said lid, wherein said cover panel includes an upper surface, a lower surface and a perimeter, wherein a plurality of integrally formed side walls extend downwardly from said cover panel perimeter terminating in an outwardly extending flange, said flange including an inner perimeter and an outer perimeter, wherein an integrally formed depending wall extends downwardly from said outer perimeter of said flange, whereby said flange and said depending wall are constructed and arranged to cooperate with said handrail in an overlapping fashion.

15. The plastic storage container as described in claim 14 wherein a plurality of tabs extend downwardly from said inner perimeter of said flange, wherein said tabs cooperate with said container side walls to prevent inward bowing or flexing thereof.

16. The plastic storage container as described in claim 14 wherein said upper surface of said cover panel is constructed and arranged to cooperate with a base panel and plurality of roller assemblies to permit an axially aligned stacked arrangement of at least two storage containers.

17. The plastic storage container as described in claim 16 wherein said upper surface of said cover panel includes a generally rectangular channel, wherein said channel is constructed and arranged to provide clearance for said plurality of spherical roller assemblies, whereby an inner portion and an outer portion of said cover panel provides support for said base panel to provide a stable axially aligned stacked arrangement of at least two storage containers.

* * * * *